(12) United States Patent
Takashima et al.

(10) Patent No.: US 6,798,524 B2
(45) Date of Patent: Sep. 28, 2004

(54) PHASE DIFFERENCE CALCULATION METHOD, DEVICE, AND SYSTEM USING OPTICAL FIBER RING INTERFERENCE SENSOR

(75) Inventors: Tetsu Takashima, Chiba (JP); Shin-ichi Nikaido, Chiba (JP); Takeshi Togura, Chiba (JP); Shin-ichi Niimi, Chiba (JP)

(73) Assignee: Fujikura Ltd., Tokyo (JP)

( * ) Notice: Subject to any disclaimer, the term of this patent is extended or adjusted under 35 U.S.C. 154(b) by 254 days.

(21) Appl. No.: 10/216,298

(22) Filed: Aug. 12, 2002

(65) Prior Publication Data
US 2003/0038946 A1 Feb. 27, 2003

(30) Foreign Application Priority Data

Aug. 21, 2001 (JP) ........................................ 2001-250263
Jun. 27, 2002 (JP) ........................................ 2002-188506

(51) Int. Cl.[7] .............................................. G01B 9/02
(52) U.S. Cl. ................................. 356/483; 250/227.19

(56) References Cited

U.S. PATENT DOCUMENTS 4,885,462 A * 12/1989 Dakin .................... 250/227.19

FOREIGN PATENT DOCUMENTS

JP 2000-46564 2/2000

OTHER PUBLICATIONS

Susumu Tsubosaka, et al., "Study on Signal Processing Scheme of Fog Using a 3×3 Coupler", Proceeding of 14th Meeting on Lightwave Sensing Technology, Japanese Society of LIghtwave Sensing Technology, Japan Society of Applied Physics, pp. 105–111, (with English abstract).

* cited by examiner

*Primary Examiner*—Samuel A. Turner
*Assistant Examiner*—Patrick Connolly
(74) *Attorney, Agent, or Firm*—Oblon, Spivak, McClelland, Maier & Neustadt, P.C.

(57) ABSTRACT

A phase difference calculation method, a device (34), and a system (38) are disclosed. In an optical fiber ring interference sensor (37) using a 3×3 optical splitting coupler (30) and an optical splitting coupler (12), linear sections are determined in advance, where a relationship between a phase difference θ of propagation lights and an intensity Ppdn (n=1, 2, 3) outputted from each photo detector (15-1, 15-2, 15-3) becomes approximately linear. The intensity Ppdn of an interference light, between propagation lights in CW and CCW directions in an optical fiber loop (13), having a difference non-reciprocal phase bias is measured not less than two times. A phase difference θ is then calculated based on the intensity Ppdn in the linear sections.

18 Claims, 9 Drawing Sheets

PHASE DIFFERENCE CALCULATION METHOD, DEVICE, AND SYSTEM USING OPTICAL FIBER RING INTERFERENCE SENSOR

CROSS-REFERENCE TO RELATED APPLICATION

This application is based upon and claims the benefit of priority from the prior Japanese Patent Applications No.P2001-250263, filed Aug. 21, 2001, and No.P2002-188506, filed Jun. 27, 2002; the entire contents of which are incorporated herein by reference.

BACKGROUND OF THE INVENTION

1. Field of the Invention

The present invention relates to a phase difference calculation method, a phase difference calculation device, and a phase difference calculation system using an optical fiber ring interference sensor capable of detecting a phase difference between propagation lights propagated, in clockwise and counter clockwise directions, through an optical fiber loop in the optical fiber ring interference sensor.

2. Description of the Related Art

Various optical fiber ring interference sensors using optical fibers have been proposed. For example, there is a Japanese unexamined patent application, regarding an optical fiber ring interference sensor. whose application number JP-A-11/70803 filed by the inventors of the present invention.

The basic principle of this type of the optical fiber ring interference sensor is as follows.

First, as shown in FIG.8, a light emission element 11 (as a light source), a photo detector (as a light reception element) 15, and both open ends of an optical fiber loop 13 are connected to an optical splitting coupler 12. In this connection stale, the photo splitting coupler 12 splits the light emitted from the light emission element 11 as the light source. Then, the split lights are inputted to both the open ends of the optical fiber loop 13. These inputted lights are propagated in the light path B of clockwise direction (CD) and the light path A of counter clockwise direction (CCD) through the optical fiber loop 13.

The propagation lights through the light paths A and B in clockwise direction and counter clockwise direction are inputted to the optical splitting coupler 12 to couple them. The photo detector 15 inputs an interference light as the coupled light. The photo detector 15 thereby outputs a detection signal indicating an intensity change of the interference light.

That is, when a vibration is applied to a part in the optical fiber loop 13, the photo detector 15 detects a change of the difference, as a change of the interference light, between distances through which the propagation lights travel through the light path B of clockwise direction and through the light path A of counter clockwise direction.

FIG. 9 is a diagram showing a configuration of an optical fiber ring interference sensor in which the photo emission element 11 or a light input terminal, the photo detector 15 or a light output terminal, and the photo slitter-coupler 12 are connected through a pair of connection optical fibers 17. In this configuration of the optical sensor ring interference sensor, the photo detector 15 detects a vibration applied to a part in the optical fiber loop 13

FIG. 10 is a diagram showing an example of a configuration of the optical fiber ring interference sensor using a single connection optical fiber.

In each optical fiber ring interference sensor described above, the light inputted through one port of the optical splitting coupler 12 is split into a transparent light and a coupled light. Those lights are then outputted through other two ports of the optical splitting coupler 12, those two ports are located at the opposite side of the coupler 12. At this time, those lights, the transparent light and the coupled light, have a phase difference of $\pi/2$.

Accordingly, in the system configuration of each optical fiber ring interference sensor shown in FIG. 8 and FIG. 9, the phase difference $\theta$ of the propagation light through the light path A and the light oath B becomes $\pi$. On the contrary, in the system configuration of the optical fiber ring interference sensor shown in FIG. 10, the phase difference $\theta$ of the propagation lights in both the paths A and B becomes zero.

In this situation, when an external disturbance such as a vibration is applied to a part of the optical fiber loop 13, the phase difference between the propagation lights occurs. As a result, the photo detector 15 detects an intensity of propagation lights corresponding to the phase difference of the propagation lights changed.

The intensity Ppd of the interference between the propagation lights detected by the photo detector 15 can be expressed by the following equation (1).

$$Ppd = Pi + (Pc(1+\cos\theta))/2 \quad (1),$$

where, Pc is an interference component detected by the photo detector 15, and Pi is non-interference component.

Therefore, when the phase difference $\theta$ is changed, the change value $|dPpd/d\theta|$ of the intensity Ppd of the interference becomes the minimum value when $\theta = n\pi$ (n is an integer), and the maximum value when $\theta = (n+1/2)\pi$.

As described above, the related art has a following drawback where the sensitivity of the optical fiber ring interference sensor is extremely low because the phase difference $\theta$ becomes $\pi$ under the static state in the systems of the optical fiber ring interference sensors shown in FIG. 8 and FIG. 9 and becomes zero under the system of the optical fiber ring interference sensor shown In FIG. 10, and the amount of the change of the intensity Ppd of the interference between the propagation lights detected by the photo detector is very low (specifically, becomes the minimum value at $\theta = 0, \pi, 2\pi, 3\pi, \ldots$ (n is an integer, for example, n=0, 1, 2, 3, ...)) even if a vibration is applied to the optical fiber loop.

Further, following methods (a), (b), and (c) to improve the sensitivity of the sensor have been known in the related art.

(a) Method of detecting an interference signal at a timing in synchronization with a modulation signal so that a phase difference $\theta$ becomes $(n+1/2)\pi$ using a lockin-amplifier (not shown) under a configuration in which a phase modulator (not shown) is inserted in an optical fiber loop;

(b) Method performed under the situation so that the phase difference between the propagation lights in paths A and B becomes $(n+1/2)\pi$; and (c) Method to obtain a bias of a non-reciprocal phase of $2/3\ \pi$ using a 3×3 optical splitting coupler.

As have clearly understood, in the various systems of the optical fiber ring interference sensors, the phase difference $\theta$ between the propagation lights in the light paths A and B in the optical fiber loop detected by the photo detector 15 affects the sensitivity of the sensor.

Hereinafter, it will be considered regarding the phase difference 74 .

In order to obtain the phase differene $\theta$ from the intensity Ppd of the interference between the propagation lights detected by the photo detector 15, it is sufficient to calculate the phase difference θ based on the equation (1).

$$\theta = \cos^{-1}[2(Ppd-Pi)/Pc-1]. \quad (2)$$

However, an inverse COS function (see the equation (2)) has innumerable solutions because it is a periodic function of 2 π.

By the way, because continuously changed, the phase difference θ can be estimated based on the waveform of $\cos^{-1}$ function. However, those methods involve a drawback that it is difficult to distinguish whether the current phase difference is shifted by π−δ (corresponding to the change indicated by the dotted line "b" in FIG. 7) from the stationary state θ=π or by π+δ (corresponding to the change indicated by the line "a" in FIG. 7) from the stationary state θ=π only by using the light intensity obtained from the photo detectors,

SUMMARY OF THE INVENTION

Accordingly, an object of the present invention is, with due consideration to the drawbacks of the conventional technique, to provide a phase difference calculation method, a phase difference calculation device, and a phase difference calculation system using an optical fiber ring interference sensor capable or calculating a phase difference θ between propagation lights outputted from the optical fiber ring interference sensor.

According to an embodiment, a phase difference calculation method using an optical fiber ring interference sensor. This optical fiber ring interference sensor has a light source, a plurality of photo detectors, an optical fiber loop, and a N×N optical splitting coupler connected to the light source, the photo detectors, and open ends of the optical fiber loop. In the sensor, the N×N optical splitting coupler splits the light emitted by the light source, the optical fiber loop inputs split lights though both open ends of the optical fiber loop, the lights are propagated through the optical fiber loop in clockwise direction and counter clockwise direction, the N×N optical splitting coupler couples the propagation lights in clockwise direction and counter clockwise direction, and the photo detectors detect the coupled propagation light, and then outputs signals indicating a variation of a light intensity of interference between the propagation lights having a phase difference in clockwise direction and counter clockwise direction.

In order to detect a physical variation caused in the optical fiber ring interference sensor, the phase difference calculation method according to an embodiment performs measuring the light intensities of interference of a different non-reciprocal phase bias not less than two times detected from a plurality of the photo detectors, and calculating a phase difference based on the light intensities when the light intensity detected from each photo detector is within a predetermined section corresponding to each photo detector.

In addition, a phase difference calculation device according to another embodiment uses an optical fiber ring interference sensor. This optical fiber ring interference sensor has a light source, a plurality of photo detectors, an optical fiber loop, and a N×N optical splitting coupler connected to the light source, the photo detectors, and open ends of the optical fiber loop. In the optical fiber ring interference sensor, the N×N optical splitting coupler splits the light emitted by and supplied from the light source, the optical fiber loop inputs the split light through both open ends of the optical fiber loop, the light is propagated through the optical fiber loop in clockwise direction and counter clockwise direction, the N×N optical splitting coupler couples propagation lights in clockwise direction and counter clockwise direction, and a plurality of the photo detectors detect the coupled propagation light, outputs signals indicating a variation of a light intensity of interference between the propagation lights having a phase difference in clockwise direction and counter clockwise direction.

In order to detect a physical variation caused in the optical fiber ring interference sensor, the phase difference calculation device according to the embodiment, connected to a plurality of the photo detectors in the optical fiber ring interference sensor, calculates a phase difference of interference between propagation lights based on light intensities obtained by a plurality of the photo detectors. That is, the phase difference calculation device measures the light intensities of interference of a different non-reciprocal phase bias not less than two times detected from a plurality of the photo detectors, and calculates a phase difference based on the light intensities when the light intensity detected from each photo detector is within a predetermined section corresponding to each photo detector.

Still moreover, a phase difference calculation system according to another embodiment has an optical fiber ring interference sensor, and a phase difference calculation device. In the system, the optical fiber ring interference sensor includes a light source, a plurality of photo detectors, an optical fiber loop, and a N×N optical splitting coupler connected to the light source, the photo detectors, and open ends of the optical fiber loop. The phase difference calculation device is connected to a plurality of the photo detectors and calculates a phase difference between propagation lights based on a light intensity obtained by a plurality of the photo detectors. In order to detect a physical variation caused in the optical fiber ring interference sensor in the system, the N×N optical splitting coupler splits the light emitted by and supplied form the light source, the optical fiber loop inputs split lights through both the open ends of the optical fiber loop, the lights are propagated through the optical fiber loop in clockwise direction and counter clockwise direction. The N×N optical splitting coupler couples the propagation lights in clockwise direction and counter clockwise direction. A plurality of the photo detectors detect the coupled propagation light, and then outputs signals indicating a variation of the light intensity of interference between the propagation lights having a phase difference in clockwise direction and counter clockwise direction. The phase difference calculation device in the system measures the light intensities of interference of a different non-reciprocal phase bias not less than two times detected from a plurality of the photo detectors, and calculates a phase difference based on the light intensities when the light intensity detected from each photo detector is within a predetermined section corresponding to each photo detector.

In particular, in the phase difference calculation method, the phase difference calculation device, and the phase difference calculation system according to embodiments, the phase difference is calculated based on a first light intensity detected by a first photo detector in the plurality of photo detectors when the first light intensity is within a section corresponding to the first photo detector. Only when the first light intensity is out of the section corresponding to the first photo detector, the phase difference is calculated based on a second light intensity detected by a second photo detector adjacent to the first photo detector when the second light intensity is within the section corresponding to the second photo detector. The phase difference is further calculated sequentially based on the light intensity obtained from other photo detectors in a plurality of the photo detectors when the second light intensity is out of the section corresponding to the second photo detector.

Still furthermore, in the method, the device, and the system described above, each predetermined section is determined in advance, where the relationship between the phase difference of the propagation lights in clockwise direction and counter clockwise direction and the light intensity becomes linear.

Moreover, in the method, the device, and the system described above, each section is determined in advance, where the relationship between the phase difference of the propagation lights in clockwise direction and counter clockwise direction and the light intensity obtained from each corresponding photo detector becomes linear.

In the method, the device, and the system described above, the phase difference is calculated by using a 3×3 optical splitting coupler as the N×N optical splitting coupler and using three photo detectors as the plurality of the photo detectors.

In the method, the device, and the system described above, the phase difference is calculated by using a 3×3 optical splitting coupler as the N×N optical splitting coupler and using two photo detectors as the plurality of the photo detectors.

The above and other features and advantages of this invention and the manner of realizing them will become more apparent, and the invention itself will best be understood, from a study of the following description and attached claims, with reference had to the attached drawings showing some preferable embodiments of the invention.

DESCRIPTION OF THE PREFERRED EMBODIMENTS

Other features of this invention will become apparent through the following description of preferred embodiments which are given for illustration of the invention and are not intended to be limiting thereof.

Embodiment

A description will he given of the phase difference calculation method, the phase difference calculation device, and the phase difference calculation system using an optical fiber ring interference sensor according to the present invention with reference to diagrams.

Figure 3:
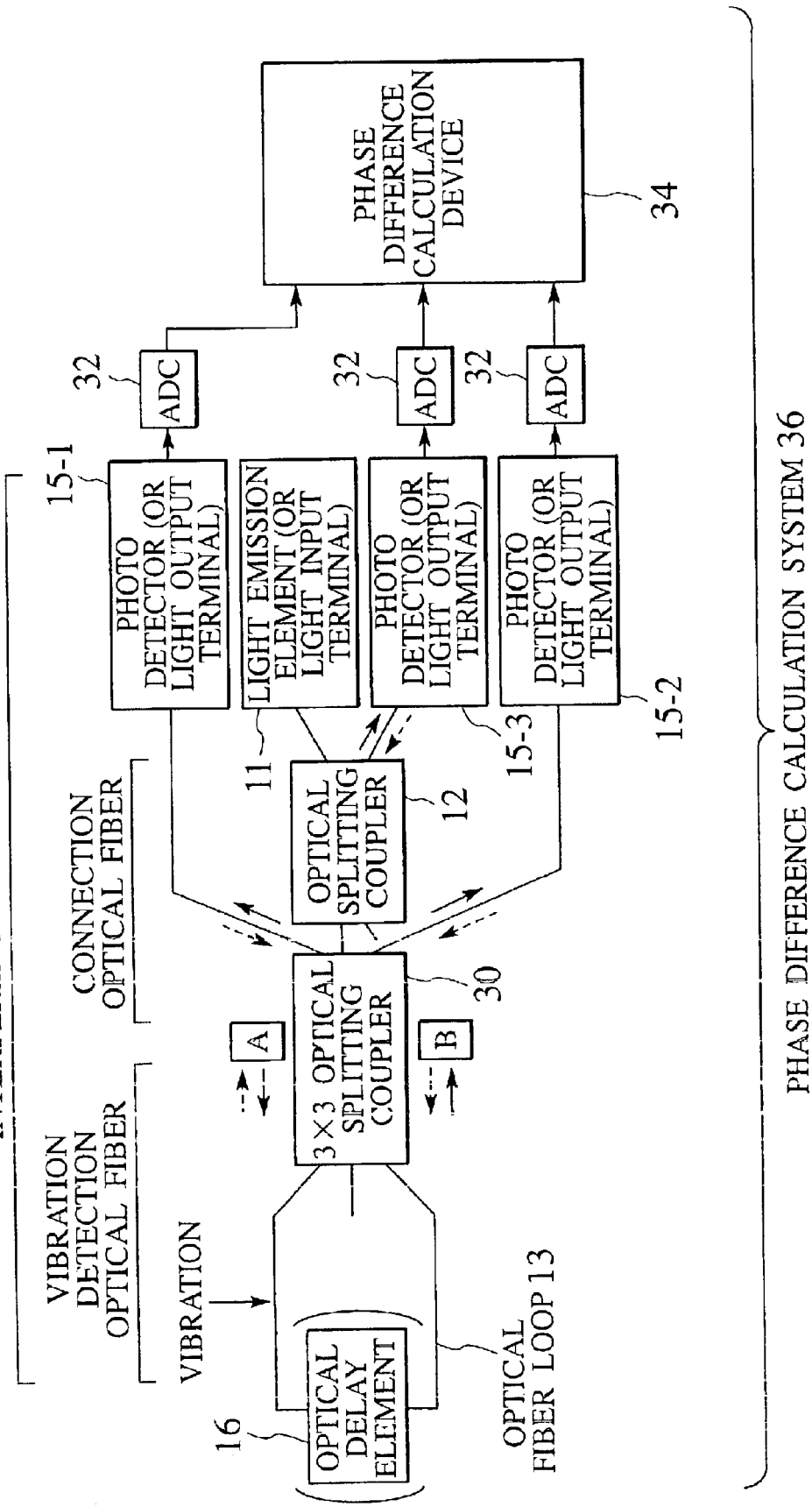
FIG. 3 is a block diagram showing a phase difference calculation system comprising a phase difference calculation device and the optical fiber ring interference sensor comprising a 3×3 optical splitting coupler according to the present invention.

FIG. 3 is a block diagram showing a phase difference calculation system comprising a phase difference calculation device 34 and an optical fiber ring interference sensor 35. The optical fiber ring interference sensor 35 comprises an optical fiber 13, a 3×3 optical splitting coupler 30 (N=3), a light emission element 11 (as a light source), photo detectors (as a light reception element) 15-1, 15-2, and 15-3. The phase difference calculation device 34 receives an intensity Ppdn (n is a positive integer) of interference between the propagation lights outputted from the photo detectors 15-1, 15-2, and 15-3 in the optical fiber ring interference sensor 35, and then calculates a phase difference θ between the propagation lights based on the detected intensity Ppdn. In FIG. 3, Each ADC 32 designates an analogue/digital converter for converting an analogue signal to a digital signal.

In this configuration shown in FIG. 3, a light from the light emission element (light source) 11 is split into propagation lights in clockwise direction (CW) and in counter clockwise direction (CCW) by the 3×3 optical splitting coupler 30. The propagation lights are propagated through the optical fiber loop 13 and are then coupled by the 3×3 optical splitting coupler 30. By using the 3×3 optical splitting coupler 30 and the photo splitting coupler 12, the periodic variation of the light intensity of interference between the propagation lights, propagated through the optical fiber loop 13 in CW and CCW directions, the light intensity is shifted by 2/3π to each other at the input ports of the photo detectors 15-1, 15-2, and 15-3. Thus, each of the three photo detectors 15-1, 15-2, and 15-3 detects the state of the propagation lights, that are interfered to each other, as the light intensities which are shifted in phase by 2/3π to each other. Thus the photo detectors 15-1, 15-2, 15-3 detect the light intensities as the state of interference between the propagation lights.

Figure 1:
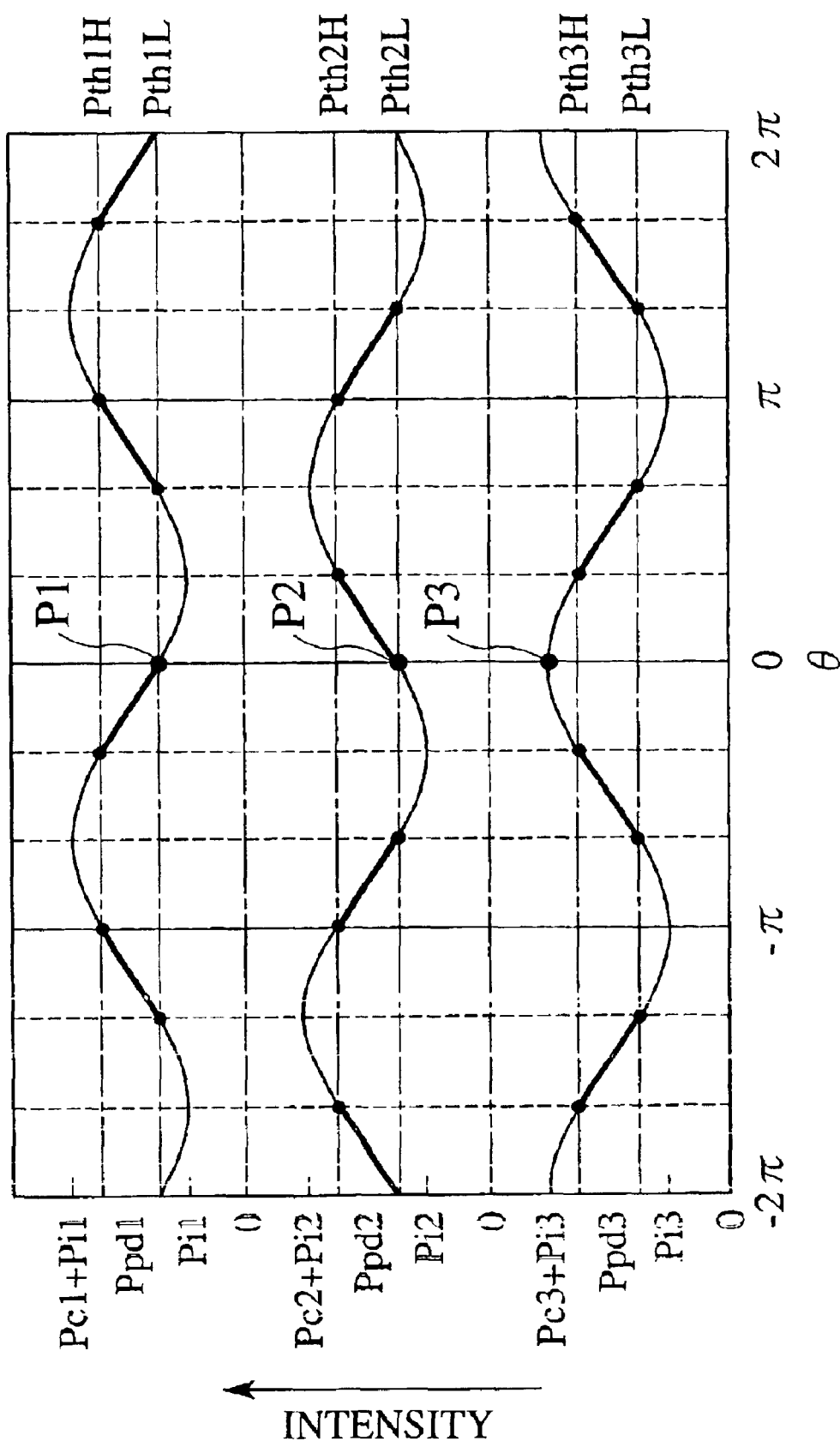
FIG. 1 is a diagram of waveforms showing relationships between a phase difference θ and an intensity Ppdn of propagation lights obtained through an optical fiber ring interference sensor comprising a 3×3 optical splitting coupler according to the present invention.

When the optical Fiber loop 13 is in a stationary state, namely, no vibration is applied to the optical fiber loop 13, the phase differences θ between the propagation lights in CW and CCW directions becomes zero (θ=0). That is, when no vibration is applied to a part of the optical fiber loop 13 shown in FIG. 3, the photo detectors 15-1, 15-2, and 15-3 detect the constant intensities P1, P2, and P3, respectively, as shown in FIG. 1. Those light intensities P1, P2, and P3 are constant values, not changed.

The light intensity Ppdn (n=1, 2, and 3) can be expressed by the following equations (3), (4), and (5):

$$Ppd1 = Pi1 + Pc1[1 + \cos(\theta + 2\pi/3)]/2 \quad (3),$$

$$Ppd2 = Pi2 + Pc2[1 + \cos(\theta - 2\pi/3)]/2 \quad (4),$$

and $$Ppd3 = Pi3 + Pc3(1 + \cos\theta)/2 \quad (5),$$

where Pcn and Pin are an interference component and a non-interference component, respectively, in the propagation lights detected by the n-th photo detector 15-n (n=1, 2, and 3).

FIG. 1 is a diagram of waveforms showing relationships between the phase difference θ and the light intensity Ppdn detected by the three photo detectors 15-n (n=1, 2, and 3).

In FIG. 1, the intensities of interference between the propagation lights obtained by the photo detector 15-1, 15-2, and 15-3 are Ppd1, Ppd2, and Ppd3, respectively. Those light intensity Ppdn (n=1, 2, and 3) are a periodic function COS θ whose maximum value is Ppdn=Pin+Pcn and whose minimum value is Ppdn=Pin, and whose amplitude is Pcn/2.

On the other hand, when a vibration is applied to a part of the optical fiber loop 13 forming the optical fiber ring interference sensor 35, the intensity Ppdn (n=1, 2, and 3) detected by the photo detectors 15-n (n=1, 2, and 3) is changed periodically according to the waveforms shown in FIG. 1. In FIG. 1, thick lines show the sections, each section has a best scale-factor in the waveform of the periodic function Ppdn (n=1, 2, and 3) (see the sections indicated by solid lines in FIG. 1).

As apparently understood in FIG. 1, it is possible to compensate for a part of a low scale-factor in one waveform of the intensity Ppdn by the part indicated by the solid line of the good scale-factor in another waveform of the intensity Ppdn.

Thus, in each section per $\pi/3$ designated by the solid line (which indicates the section of the good scale-factor), the intensity Ppdn obtained by each photo detector 15-n corresponds linearly to the phase difference θ. Therefore it is possible to obtain the phase difference θ automatically based on the magnitude of the intensity Ppdn if it is recognized to which selection the detected intensity Ppdn belongs.

Because the phase difference θ between the propagation lights is changed continuously, it is possible to specify the current section to which the current phase difference θ belongs by tracing the change of the phase difference θ.

Figure 2:
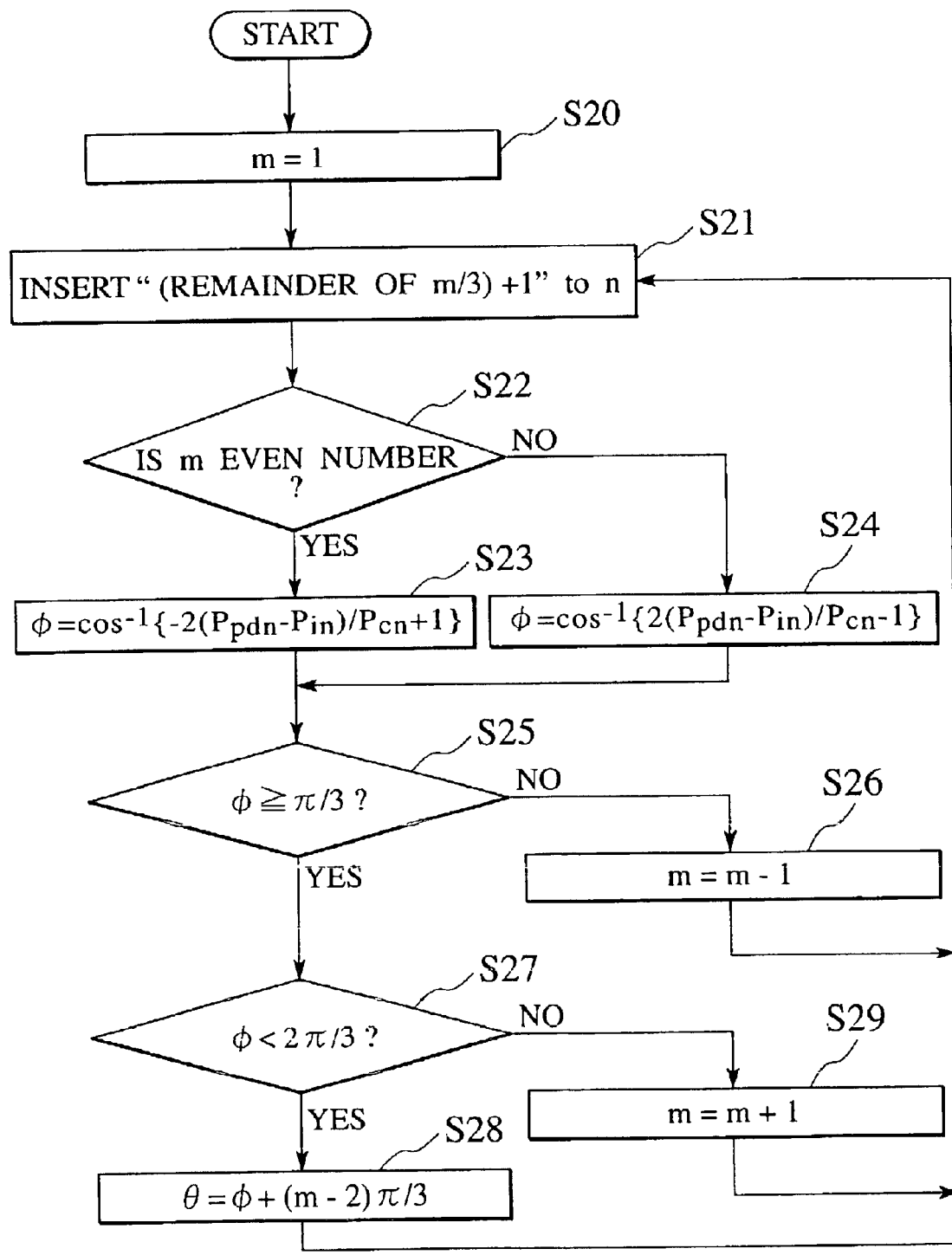
FIG. 2 is a flowchart of a calculation process for calculating a phase difference θ between propagation lights based on the waveforms shown in FIG. 1 performed by a phase difference calculation device shown in following FIG. 3.

FIG. 2 is a flowchart of a calculation process for calculating the phase difference θ between propagation lights performed by the phase difference calculation device 34 using the optical fiber ring interference sensor 35 shown in FIG. 3.

Next, a description will be given of the explanation of the phase difference calculation method performed by the phase difference calculation device shown in FIG. 3 with reference to the flowchart of FIG. 2.

In the flowchart shown in FIG. 2, the intensity Ppdn (n=1, 2, and 3) obtained by the photo detectors 15-1, 15-2, and 15-3 are changed according to the periodic function (cosine (COS) function).

In the variation of the intensity Ppdn as the periodic function, $\phi$ is calculated in the range $0<=\phi<\pi$ using a non-interference component Pin and an interference component Pcn. When the relationship of $\pi/3<=\phi<2\pi/3$ is satisfied, the phase difference θ is obtained by compensating $\phi$ ($\theta=\phi+(m-1)\pi/3$).

Here, the values $\theta=\pi/3$ and $2\pi/3$ correspond to the values PthnH and PthnL(n=1, 2, and 3), respectively, in the change of the intensity Ppdn shown in FIG. 1. Accordingly, it can be considered that the intensity Ppdn is changed linearly to the change of the phase difference θ only when the intensity Ppdn obtained by the photo detectors 15-1, 15-2, and 15-3 are within the range between PthnH and PthnL, The phase difference θ of the propagation lights can be thereby obtained using the change of the intensity Ppdn in this range.

Both the values Pin and Pcn (n=1, 2, and 3) are determined only by the measurement system (comprising the optical fiber loop 13 and the optical splitting coupler 30) in the optical fiber ring interference sensor. The values PthnH and PthnL are ranges of the intensity obtained by the photo detectors 15-1, 15-2, and 15-3. The phase difference 74 can be calculated by using the intensity in the range PthnH and PthnL First, the initial value "1" is inserted to a variable "m" (Step S20).

Next, in Step S21, the variable "m" is divided by three (the initial value or the variable "m" is "1"), the value "1" is added to the reminder of this division. The result of this addition is inserted to the variable "n" (Step S21). In Step S21, a remainder of m/3 is a value that is not more than m and that is obtained by subtracting the largest multiple of 3 from m. For example, when m=1, "n" becomes 1 (n=1), and when m=−4, "n" becomes 3 (n=3).

Next, it is checked whether the variable "m" is an odd or even number. When "m" is an odd number, the operation flow goes to Step S23. In Step S23, the value $\phi$ is calculated based on the following equation:

$$\phi=\cos^{-1}[-2(Ppdn-Pin)/Pcn+1],$$

where $\phi$ is calculated in the range of $0<=\phi<\pi$.

On the other hand, when the variable "m" is an even number in the checking process (Step S23), the operation flow goes to Step S24. In Step S24, the value $\phi$ is calculated based on the following equation:

$$\phi=\cos^{-1}[2(Ppdn-Pin)/Pcn-1],$$

where $\phi$ is calculated in the range of $0<=\phi<\pi$.

Next, it is checked whether the calculation result $\phi$ of the above equation is not less than $\pi/3$ or not. When $\phi$ is not less than $\pi/3$ ($\phi>=\pi/3$), the operation flow goes to Step S27 (Step S25).

When $\phi$ is less than $\pi/3$ ($\phi<\pi/3$) in Step S25, the operation flow goes to Step S26. In Step S26, the value "m−1" is inserted to the variable "m", and then the operation flow goes back to Step S21 in order to perform the above processes repeatedly.

In Step S27, it is checked whether the calculation result $\phi$ is less than $2\pi/3$ (Step S27). When $\phi$ is less than $2\pi/3$, the phase difference θ is calculated by the following equation.

$$\theta=\phi+(m-2)\pi/3.$$

The phase difference calculation device 34 outputs the calculation result of the phase difference θ to external devices (not shown).

On the contrary, when $\phi$ is not less than $2\pi/3$ in Step S27, the operation flow goes to Step S29. In Step S29, the value "m+1" is inserted to the variable "m". The operation flow then goes back to Step S21 in order to perform the above processes repeatedly.

As described above, in the phase difference calculation device of this embodiment, because the initial value of the variable "m" is one in Step S21, at first, the above checks are performed based on the intensity Ppd2 obtained from the second photo detector 15-2 (n=2). If the above various conditions are satisfied, the calculation of the phase difference θ is firstly performed based on the intensity Ppd2 obtained from the second photo detector 15-2 (n=2). Then, the same processes are performed in order to obtain the phase difference θ based on the intensity Ppd1 or Pps3 (n=1 or 3) obtained form the first or third photo detector 15-1 or 15-3.

In the phase difference calculation method described above, although the 3×3 optical splitting coupler 30 is used, it is possible to use other splitting couplers such as a 4×4 optical splitting coupler (N=4) or a 5×5 optical splitting coupler (N=5). In this case, it is possible to calculate the phase difference θ by the above manner if a phase bias between interference lights (propagation lights) other than π can be measured not less than two.

Figure 4:
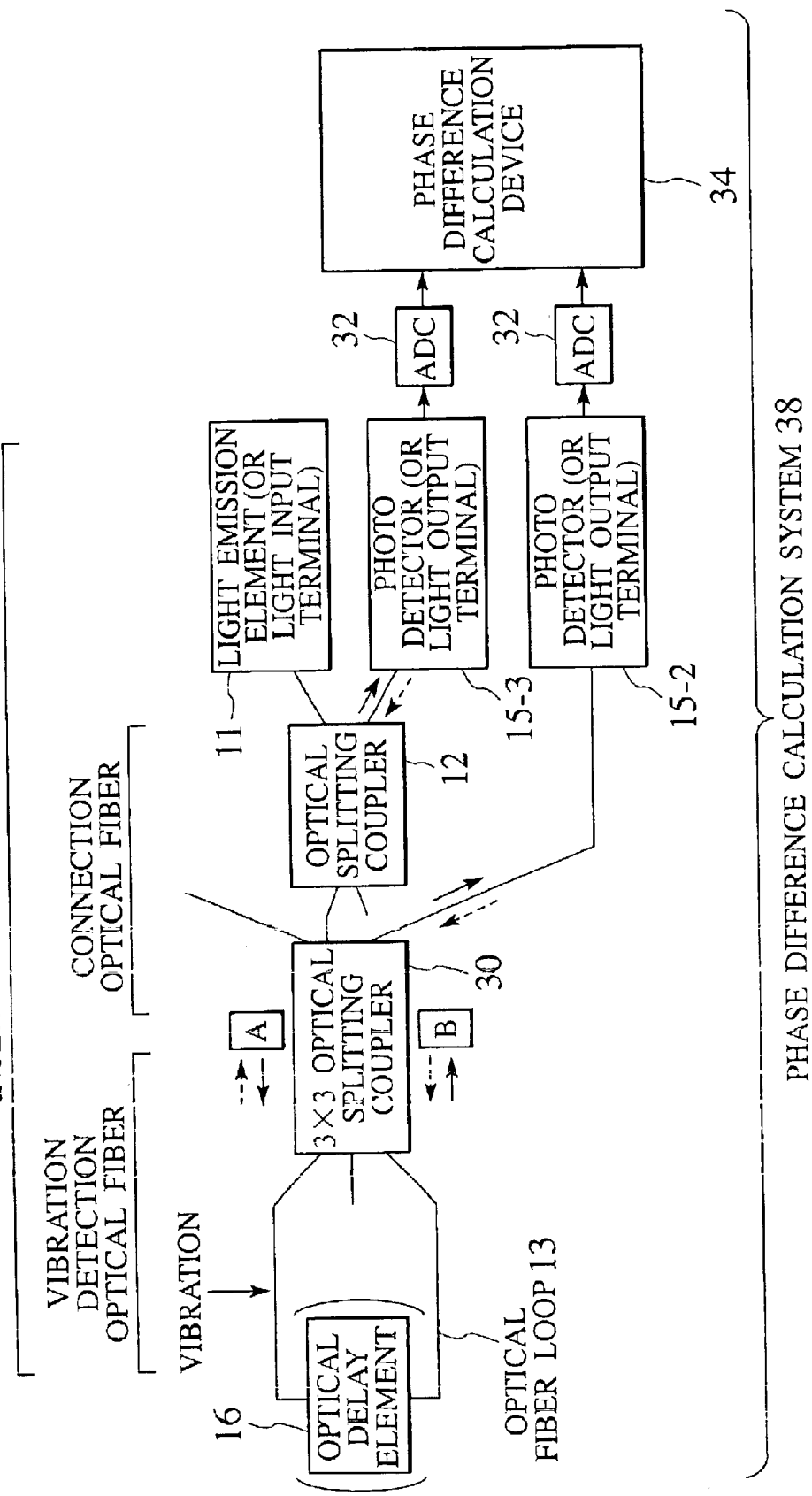
FIG. 4 is a block diagram showing an example of another configuration of the phase difference calculation system comprising the phase difference calculation device and an optical fiber ring interference sensor according to the present invention.

In order to achieve a simple configuration, as shown in FIG. 4, it is possible to eliminate one of the connection optical fiber and one of the photo detectors from the configuration shown in FIG. 3. In this configuration of the phase difference calculation system shown in FIG. 4, although it is increased in complexity how to divide the value φ and how to determine the threshold values for the intensity Ppdn, the basic calculation for calculating the phase difference θ is the same manner of the case described above.

Figure 5:
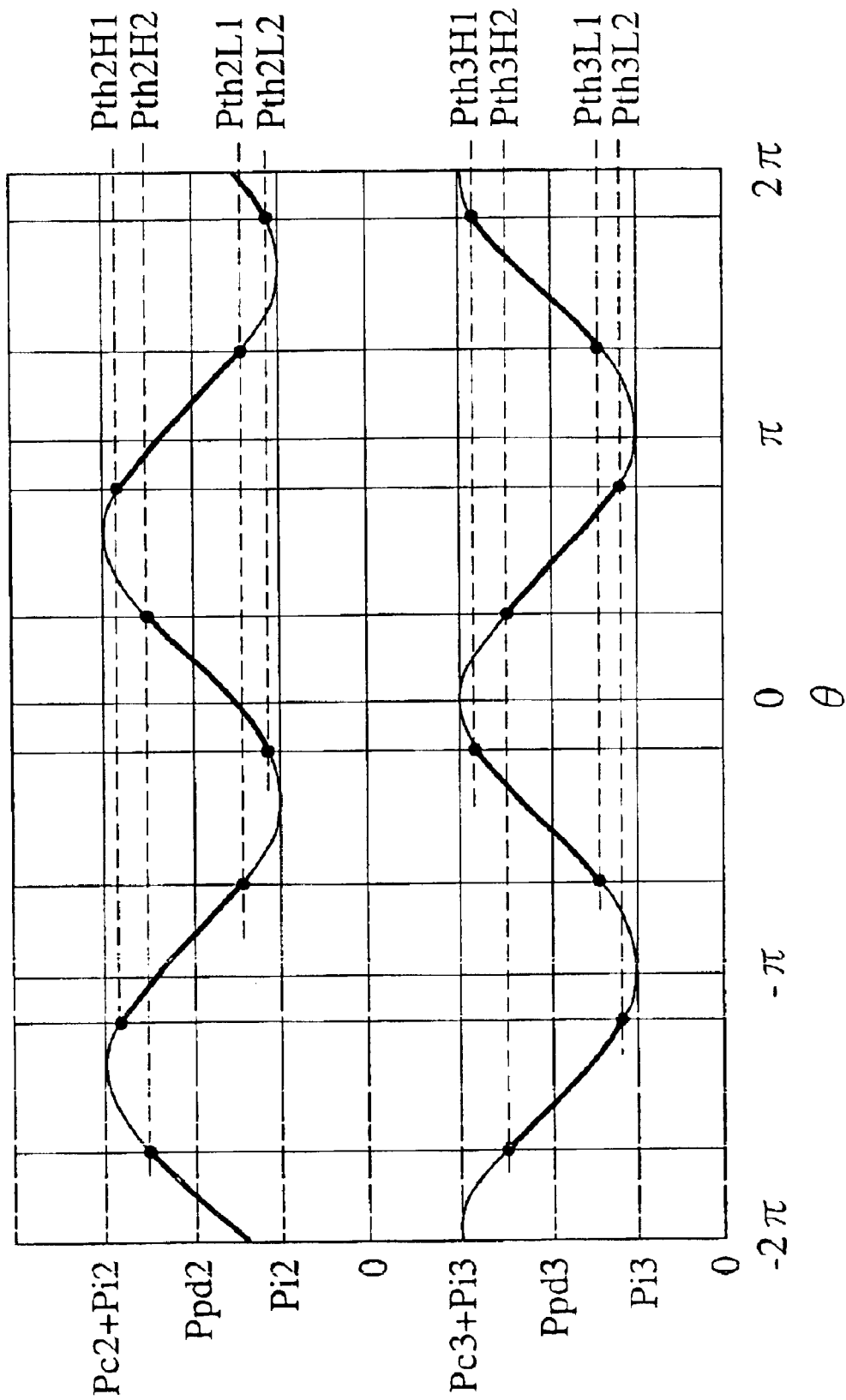
FIG. 5 is a diagram of waveforms showing relationships between a phase difference θ and an intensity Ppdn of propagation lights obtained through the optical fiber ring interference sensor shown in FIG. 4.

FIG. 5 is a diagram of waveforms showing relationships between the phase difference θ and the intensities Ppd2 and Ppd3 of the propagation lights obtained by the two photo detectors 15-2 and 15-3 in the optical fiber ring interference sensor 37 shown in FIG. 4.

In FIG. 5, because the intensity Ppd2 detected by and obtained from the photo detector 15-2 is changed linearly to the change of the phase difference θ only when the intensity Ppd2 is within the range of Pth2H1 and Pth2L1 and the range of Pth2H2 and Pth2L2, it is possible to calculate the phase difference θ of the propagation lights based on the intensity Ppd2 in this linearly-changed section.

Similarly, because the intensity Ppd3 of the propagation lights detected by the photo detector 15-3 is changed linearly to the change of the phase difference θ only when the intensity Ppd3 is within the range of Pth3H1 and Pth3L1 and the range of Pth3H2 and Pth3L2, it is possible to calculate the phase difference θ of the propagation lights based on the intensity Ppd2 in this linearly-changed section.

Figure 6:
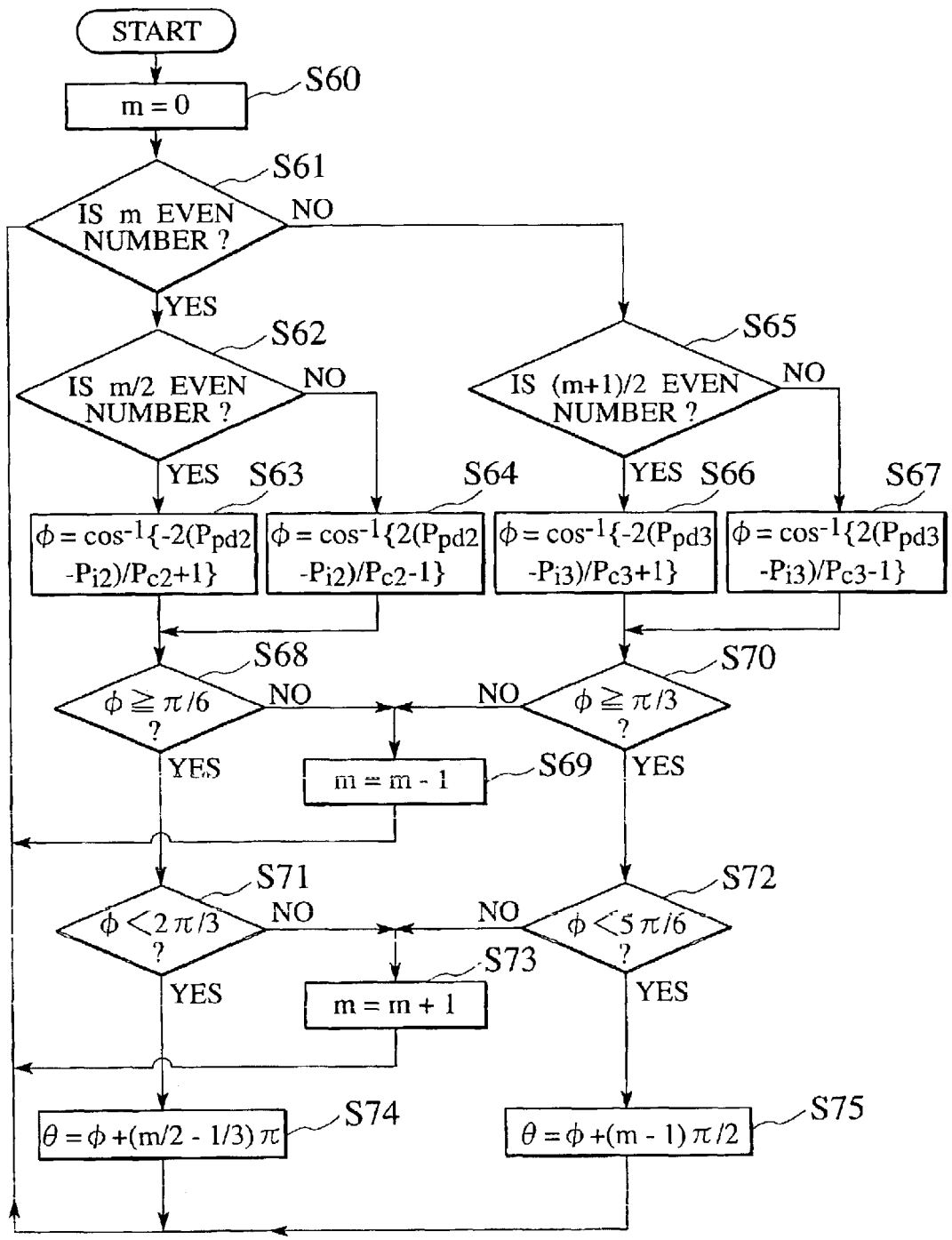
FIG. 6 is a flowchart of a calculation process for calculating a phase difference θ between propagation lights based on the waveforms shown in FIG. 5.
Figure 7:
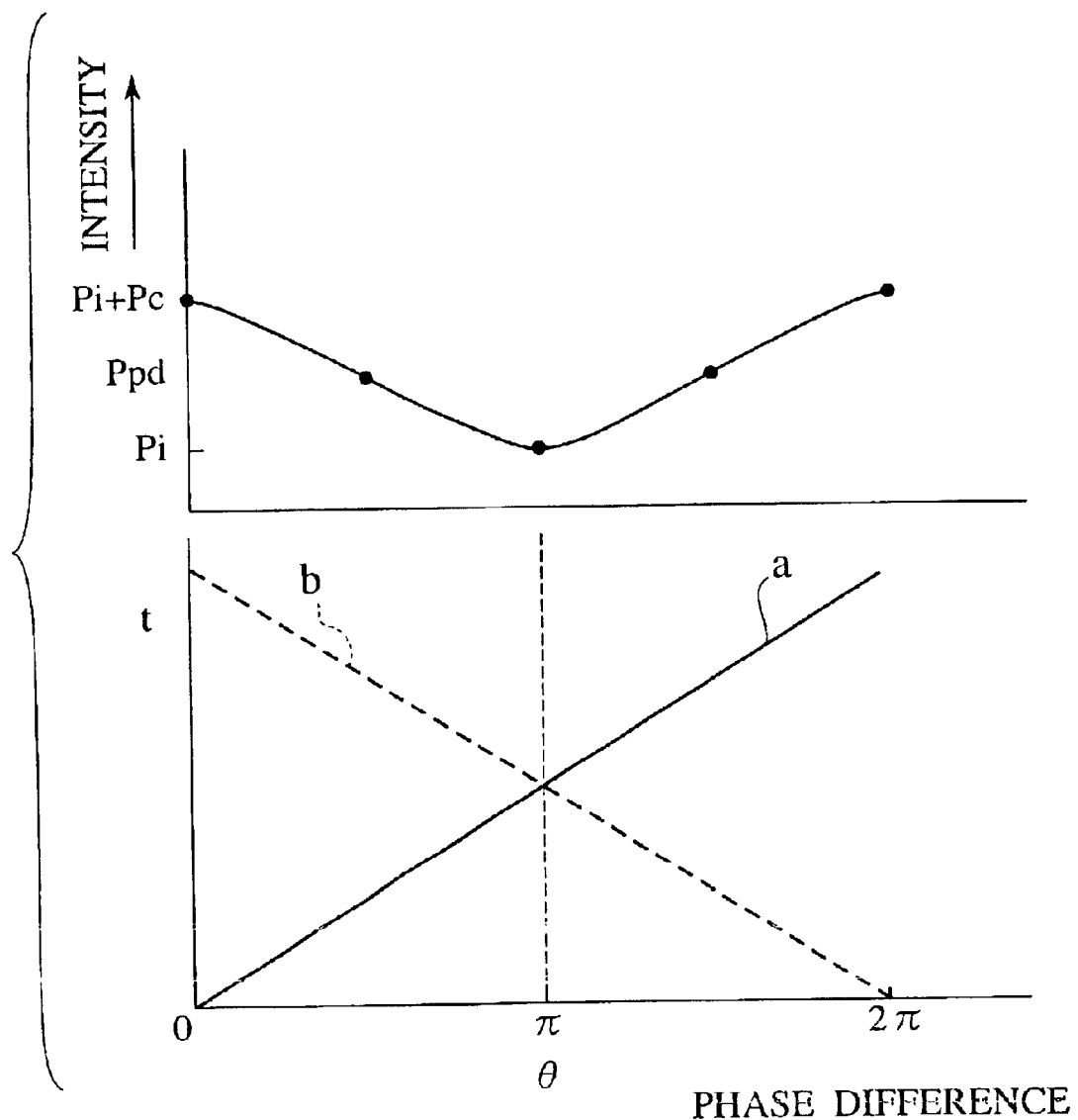
FIG. 7 is a diagram showing an explanation of a relationship between the phase difference θ and the intensity Ppdn.
Figure 8:
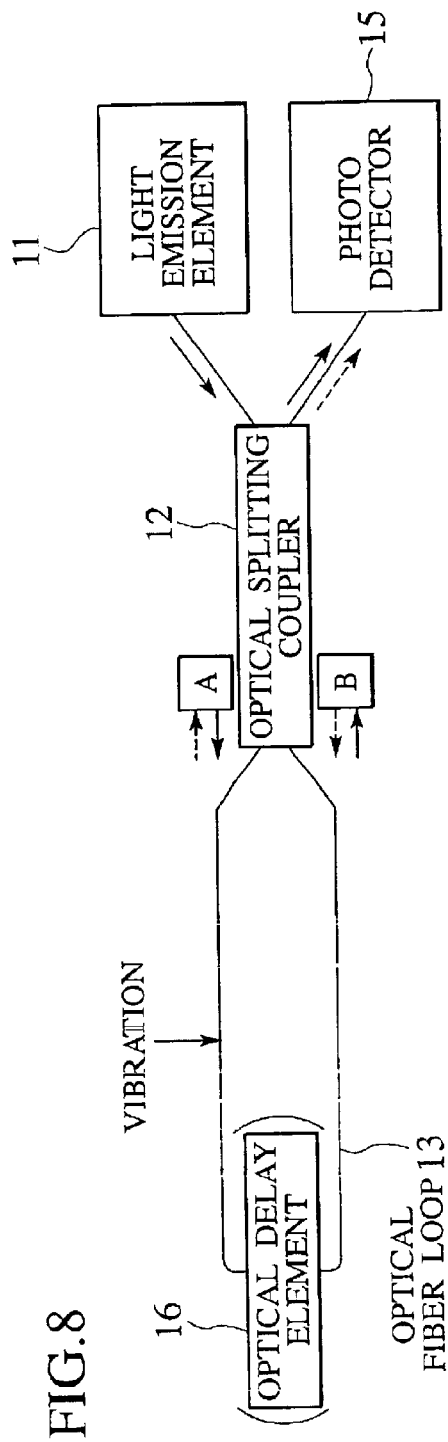
FIG. 8 is a block diagram showing a basic principal of the optical fiber ring interference sensor.
Figure 9:
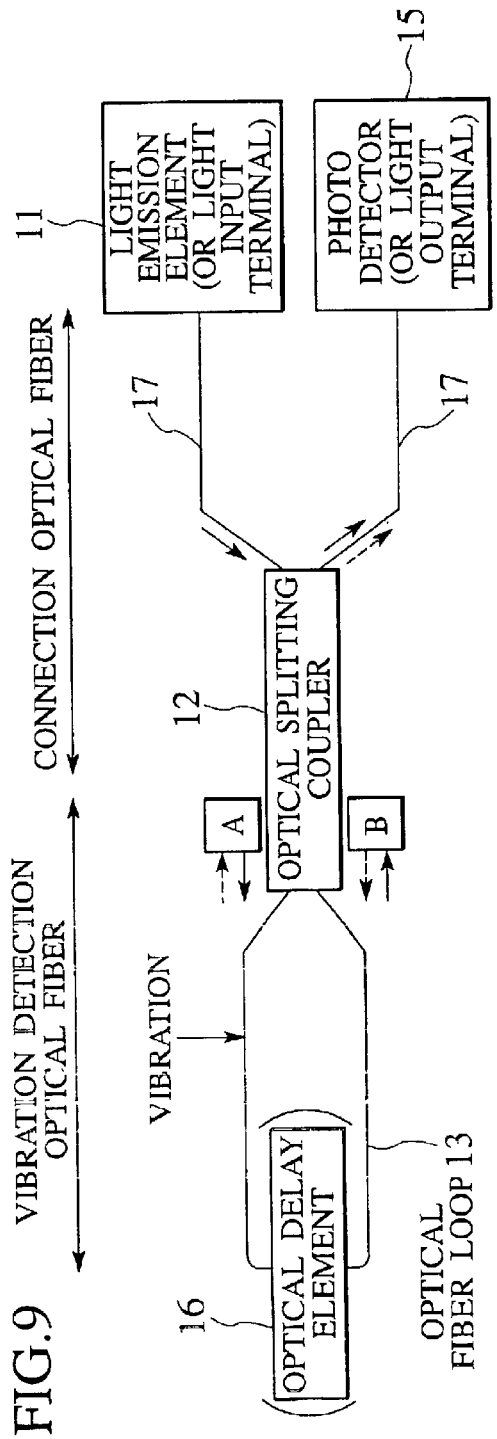
FIG. 9 is a block diagram showing an example of a configuration of the optical fiber ring interference sensor.
Figure 10:
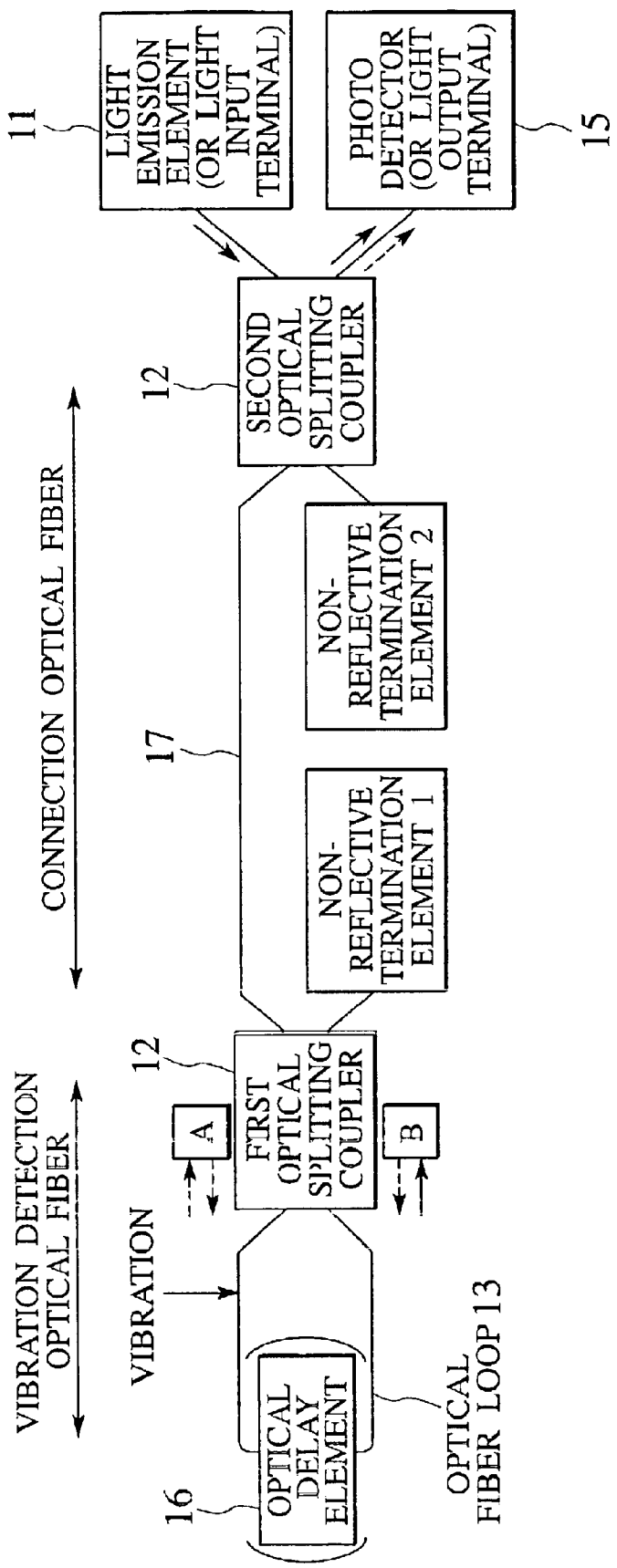
FIG. 10 is a block diagram showing an example of another configuration of the optical fiber ring interference sensor.

FIG. 6 is a flowchart showing a calculation process for calculating the phase difference θ between the propagation lights performed by the phase difference calculation device 34 using the optical fiber ring interference sensor 37 in the phase difference calculation system 38 having the configuration shown in FIG. 4.

First, the initial value zero is inserted to a variable "m" (Step S61).

Next, in Step S62, it is checked whether the variable "m" is an even number or not. When the value "m" is an even number, the operation flow goes to Step S62 where it is checked whether the value "m/2" is an even number or not.

In Step S62, when the value "m/2" is an even number, the operation flow goes to Step S63. In Step S63, the value φ is calculated by the following equation.

$$\phi = \cos^{-1}[-2(Ppd2-Pi2)/Pc2+1],$$

where φ is calculated in the range of $0 <= \phi < \pi$.

On the other hand, in Step S62, when the value "m/2" is not an even number, the operation flow goes to Step S64. In Step S64 the value φ is calculated by the following equation.

$$\phi = \cos^{-1}[2(Ppd2-Pi2)/Pc2-1],$$

where φ is calculated in the range of $0 <= \phi < \pi$.

After the completion of the calculation process in Step S63 or Step S64, the operation flow goes to Step S68.

On the other hand, in the judgment or Step S61, when the value "m" is not an even number, the operation flow goes to Step S65. In Step S65, it is checked whether the value "(m+1)/2 is an even number or not. When the value "(m+1)/2 is an even number, the operation flow goes to Step S66.

In Step S66, the value φ is calculated by the following equation.

$$\phi = \cos^{-1}[-2(Ppd3-Pi3)/Pc3+1],$$

where φ is calculated in the range $0 <= \phi < \pi$.

On the contrary, in Step S65 when the value "(m+1)/2" is not an even number, the operation flow goes to Step S67. In Step S67, the value φ is calculated by the following equation.

$$\phi = \cos^{-1}[2(Ppd3-Pi3)/Pc3-1],$$

where φ is calculated in the range of $0 <= \phi < \pi$.

After the completion of the calculation process in Step S66 or Step S67, the operation flow goes to Step S70.

In Step S68, it is checked whether or not the value φ is not less than π/6.

When the value φ is not less than π/6, the operation flow goes to Step S71. In Step S71, it is checked whether or not the value is less than 2π/3.

On the other hand, in the judgment or Step S68, when the value φ is less than π/6, the operation flow goes to Step S69. In Step S69, the value "m−1" is inserted to the variable "m". Then, the operation flow then goes back to Step S61.

The result of the judgment in Step S71, when the value φ is less than 2π/3, the operation flow goes to Step S74. In Step S74, the phase difference θ is calculated by the following equation.

$$\theta = \phi + (m2 - 1/3)\pi.$$

The phase difference θ as the calculation result is outputted to external devices (not shown). Then, the operation flow goes back to Step S61.

On the other hand, in the judgment of Step S71, when the value φ is not less than 2π/3, the operation flow goes to Step S73. In Step S73, the value "m+1" is inserted to the variable "m", and the operation flow goes back to Step S61.

In the judgment of Step S70 after the process in Step S66 or Step S67, when the value φ is not less than π/3, the operation flow goes to Step S72. In Step S72, it is checked whether the value φ is less than 5π/6 or not.

In the judgment of Step S72, when the value φ is less than 5π/6, the operation flow goes to Step S75. In Step S75, the phase difference θ is calculated by the following equation.

$$\theta = \phi + (m-1)\pi/2.$$

The phase difference θ as the calculation result is outputted to external devices (not shown). Then, the operation now goes back to Step S61.

On the other hand, in the judgment of Step S70, when the value φ is less than π/3, the operation flow goes to Step S69. In Step S69, the value "m−1" is inserted to the variable "m". Then, the operation flow then goes back to Step S61.

In the judgment of Step S72, when the value φ is not less than 5π/6, the operation now goes to Step S73. In Step S73, the value "m+1" is inserted to the variable "m". Then, the operation flow then goes back to Step S61.

As described above, it is also possible to calculate the phase difference θ under the configuration shown in FIG. 4 in which one photo detector is eliminated from the configuration shown in FIG. 3.

As set forth in detail, according to the phase difference calculation method, device, and system using various optical fiber ring interference sensors of the present invention, it is possible in theory to infinitely expand the range of the detectable phase difference.

On the contrary, in the techniques of the related art, the detectable phase difference is only within one period of a waveform and it is impossible to detect that the phase deference is over the detectable range.

All these and other modifications and alterations of the illustrated embodiments within the common knowledge of the specialists are intended in the foregoing disclosure. It is therefore appropriate that the invention be construed broadly and in a manner consistent with the fair meaning of proper scope of the subjoined claims.

What is claimed is:

1. A phase difference calculation method using an optical fiber ring interference sensor including a light source, a plurality of photo detectors, an optical fiber loop, and a N×N optical splitting coupler connected to the light source, the photo detectors, and open ends of the optical fiber loop, in which in order to detect a physical variation caused in the optical fiber ring interference sensor, the N×N optical splitting coupler splits the light emitted by the light source, the optical fiber loop inputs split lights through both open ends of the optical fiber loop, the lights are propagated through the optical fiber loop in clockwise direction and counter clockwise direction, the N×N optical splitting coupler couples the propagation lights in clockwise direction and counter clockwise direction, and the photo detectors detect the coupled propagation light, and then outputs signals indicating a variation of a light intensity of interference between the propagation lights having a phase difference in clockwise direction and counter clockwise direction, the phase difference calculation method comprising:

measuring the light intensities of interference of a different non-reciprocal phase bias not less than two times detected from a plurality of the photo detectors; and calculating a phase difference based on the light intensities when the light intensity detected from each photo detector is within a predetermined section corresponding to each photo detector.

2. The phase difference calculation method according to claim 1, wherein the phase difference is calculated based on a first light intensity detected by a first photo detector in the plurality of photo detectors when the first light intensity is within a section corresponding to the first photo detector, only when the first light intensity is out of the section corresponding to the first photo detector, the phase difference is calculated based on a second light intensity detected by a second photo detector adjacent to the first photo detector when the second light intensity is within the section corresponding to the second photo detector, and the phase difference is further calculated sequentially based on the light intensity obtained from other photo detectors in a plurality of the photo detectors when the second light intensity is out of the section corresponding to the second photo detector.

3. The phase difference calculation method according to claim 1, wherein each predetermined section is determined in advance, where the relationship between the phase difference of the propagation lights in clockwise direction and counter clockwise direction and the light intensity becomes linear.

4. The phase difference calculation method according to claim 1, wherein each section is determined in advance, where the relationship between the phase difference of the propagation lights in clockwise direction and counter clockwise direction and the light intensity obtained from each corresponding photo detector becomes linear.

5. The phase difference calculation method according to claim 1, wherein the phase difference is calculated by using a 3×3 optical splitting coupler as the N×N optical splitting coupler and using three photo detectors as the plurality of the photo detectors.

6. The phase difference calculation method according to claim 1, wherein the phase difference is calculated by using a 3×3 optical splitting coupler as the N×N optical splitting coupler and using two photo detectors as the plurality of the photo detectors.

7. A phase difference calculation device using an optical fiber ring interference sensor including a light source, a plurality of photo detectors, an optical fiber loop, and a N×N optical splitting coupler connected to the light source, the photo detectors, and open ends of the optical fiber loop, in which in order to detect a physical variation caused in the optical fiber ring interference sensor, the N×N optical splitting coupler splits the light emitted by and supplied from the light source, the optical fiber loop inputs the split light through both open ends of the optical fiber loop, the light is propagated through the optical fiber loop in clockwise direction and counter clockwise direction, the N×N optical splitting coupler couples propagation lights in clockwise direction and counter clockwise direction, and a plurality of the photo detectors detect the coupled propagation light, outputs signals indicating a variation of a light intensity of interference between the propagation lights having a phase difference in clockwise direction and counter clockwise direction, the phase difference calculation device connected to a plurality of the photo detectors in the optical fiber ring interference sensor calculates a phase difference of interference between propagation lights based on light intensities obtained by a plurality of the photo detectors, wherein the phase difference calculation device measures the light intensities of interference of a different non-reciprocal phase bias not less than two times detected from a plurality of the photo detectors, and calculates a phase difference based on the light intensities when the light intensity detected from each photo detector is within a predetermined section corresponding to each photo detector.

8. The phase difference calculation device according to claim 7, wherein the device calculates the phase difference based on a first light intensity detected by a first photo detector in the plurality of photo detectors when the first light intensity is within a section corresponding to the first photo detector, only when the first light intensity is out of the section corresponding to the first photo detector, the device calculates the phase difference based on a second light intensity detected by a second photo detector adjacent to the first photo detector when the second light intensity is within the section corresponding to the second photo detector, and the device further calculates sequentially the phase difference based on the light intensity obtained from other photo detectors in a plurality of the photo detectors when the second light intensity is out of the section corresponding to the second photo detector.

9. The phase difference calculation device according to claim 7, wherein each predetermined section is determined in advance, where the relationship between the phase difference of the propagation lights in clockwise direction and counter clockwise direction and the light intensity becomes linear.

10. The phase difference calculation device according to claim 7, wherein each section is determined in advance, where the relationship between the phase difference of the propagation lights in clockwise direction and counter clockwise direction and the light intensity obtained from each corresponding photo detector becomes linear.

11. The phase difference calculation device according to claim 7, wherein the phase difference is calculated by using a 3×3 optical splitting coupler as the N×N optical splitting coupler and using three photo detectors as the plurality of the photo detectors.

12. The phase difference calculation device according to claim 7, wherein the phase difference is calculated by using a 3×3 optical splitting coupler as the N×N optical splitting coupler and using two photo detectors as the plurality of the photo detectors.

13. A phase difference calculation system comprising:
an optical fiber ring interference sensor; and
a phase difference calculation device,
wherein
the optical fiber ring interference sensor comprises: a light source; a plurality of photo detectors; an optical fiber loop; and a N×N optical splitting coupler connected to the light source, the photo detectors, and open ends of the optical fiber loop,
the phase difference calculation device is connected to a plurality of the photo detectors and calculates a phase difference between propagation lights based on a light intensity obtained by a plurality of the photo detectors,
wherein
in order to detect a physical variation caused in the optical fiber ring interference sensor, the N×N optical splitting coupler splits the light emitted by and supplied form the light source,
the optical fiber loop inputs split lights through both the open ends of the optical fiber loop, the lights are propagated through the optical fiber loop in clockwise direction and counter clockwise direction,
the N×N optical splitting coupler couples the propagation lights in clockwise direction and counter clockwise direction,
a plurality of the photo detectors detect the coupled propagation light, and then outputs signals indicating a variation of the light intensity of interference between the propagation lights having a phase difference in clockwise direction and counter clockwise direction,
the phase difference calculation device measures the light intensities of interference of a different non-reciprocal phase bias not less than two times detected from a plurality of the photo detectors, and
calculates a phase difference based on the light intensities when the light intensity detected from each photo detector is within a predetermined section corresponding to each photo detector.

14. The phase difference calculation system according to claim 13, wherein
the phase difference calculation device calculates the phase difference based on a first light intensity detected by a first photo detector in the plurality of photo detectors when the first light intensity is within a section corresponding to the first photo detector,
only when the first light intensity is out of the section corresponding to the first photo detector, the device calculates the phase difference based on a second light intensity detected by a second photo detector adjacent to the first photo detector when the second light intensity is within the section corresponding to the second photo detector, and
the phase difference calculation device further calculates sequentially the phase difference based on the light intensity obtained from other photo detectors in a plurality of the photo detectors when the second light intensity is out of the section corresponding to the second photo detector.

15. The phase difference calculation system according to claim 13, wherein each predetermined section is determined in advance, where the relationship between the phase difference of the propagation lights in clockwise direction and counter clockwise direction and the light intensity becomes linear.

16. The phase difference calculation system according to claim 13, wherein each section is determined in advance, where the relationship between the phase difference of the propagation lights in clockwise direction and counter clockwise direction and the light intensity obtained from each corresponding photo detector becomes linear.

17. The phase difference calculation system according to claim 13, wherein the device calculates the phase difference by using a 3×3 optical splitting coupler as the N×N optical splitting coupler and using three photo detectors as the plurality of the photo detectors.

18. The phase difference calculation system according to claim 13, wherein the device calculates the phase difference by using a 3×3 optical splitting coupler as the N×N optical splitting coupler and using two photo detectors as the plurality of the photo detectors.

* * * * *